(12) United States Patent
Sunaga

(10) Patent No.: US 11,396,018 B2
(45) Date of Patent: Jul. 26, 2022

(54) FLUID HANDLING DEVICE AND FLUID HANDLING SYSTEM

(71) Applicant: Enplas Corporation, Saitama (JP)

(72) Inventor: Nobuya Sunaga, Saitama (JP)

(73) Assignee: Enplas Corporatiom, Saitama (JP)

( * ) Notice: Subject to any disclaimer, the term of this patent is extended or adjusted under 35 U.S.C. 154(b) by 189 days.

(21) Appl. No.: 16/969,193

(22) PCT Filed: Feb. 12, 2019

(86) PCT No.: PCT/JP2019/004908
§ 371 (c)(1),
(2) Date: Aug. 12, 2020

(87) PCT Pub. No.: WO2019/159905
PCT Pub. Date: Aug. 22, 2019

(65) Prior Publication Data
US 2020/0368749 A1    Nov. 26, 2020

(30) Foreign Application Priority Data
Feb. 14, 2018    (JP) .............................. JP2018-023988

(51) Int. Cl.
*B01L 3/00*        (2006.01)
*B01J 19/00*       (2006.01)
*G01N 37/00*       (2006.01)

(52) U.S. Cl.
CPC . *B01L 3/502784* (2013.01); *B01L 2200/0605* (2013.01); *B01L 2200/0652* (2013.01);
(Continued)

(58) Field of Classification Search
CPC ..... B01L 2200/0605; B01L 2200/0652; B01L 3/502784
See application file for complete search history.

(56) References Cited

U.S. PATENT DOCUMENTS

2002/0022261 A1    2/2002   Anderson et al.
2004/0224380 A1    11/2004  Chou et al.
(Continued)

FOREIGN PATENT DOCUMENTS

| CN | 107206334 | 9/2017 |
| WO | WO 2019/159905 | 8/2019 |

OTHER PUBLICATIONS

International Search Report and the Written Opinion dated Apr. 9, 2019 From the International Searching Authority Re. Application No. PCT/JP2019/004908 and Its Translation of Search Report Into English. (9 Pages).
(Continued)

*Primary Examiner* — Christopher Adam Hixson

(57) ABSTRACT

A fluid handling device has an introduction port, a first flow channel which is connected to the introduction port and in which a droplet can move when a fluid including the droplet is caused to flow therein, a first chamber for capturing the droplet moving through the first flow channel, and a second chamber through which the droplet captured by the first chamber can move via the first flow channel. The liquid handling device is capable of switching between a first state in which a droplet moving through the first flow channel is captured by the first chamber, and a second state in which the droplet captured by the first chamber moves to the second chamber via the first flow channel.

11 Claims, 11 Drawing Sheets

(52) U.S. Cl.
CPC ..... *B01L 2300/044* (2013.01); *B01L 2400/02* (2013.01); *B01L 2400/06* (2013.01)

(56) References Cited

U.S. PATENT DOCUMENTS

| | | |
|---|---|---|
| 2011/0177586 A1 | 7/2011 | Ismagilov et al. |
| 2017/0266633 A1 | 9/2017 | Schwemmer et al. |
| 2020/0181551 A1* | 6/2020 | Lee .................... C12M 27/16 |

OTHER PUBLICATIONS

Wyatt Shields et al. "Microfluidic Cell Sorting: A Review of the Advances in the Separation of Cells from Debulking to Rare Cell Isolation", Lab on a Chip, 15:1230-1249, 2015.

* cited by examiner

FLUID HANDLING DEVICE AND FLUID HANDLING SYSTEM

TECHNICAL FIELD

The present invention relates to a fluid handling device and a fluid handling system.

BACKGROUND ART

Fluid handling devices for the highly accurate analysis of small amounts of analytes such as cells, proteins, nucleic acids, etc., in clinical, food, environmental and other tests are known. For example, a fluid handling device is known that handles a tiny liquid droplet (hereinafter referred to also as "droplet") of 0.1 to 1000 μm in diameter generated from a fluid containing the above-mentioned analytes (see, e.g., NPL 1). In the above-mentioned fluid handling device, a droplet including a predetermined analyte (hereinafter also referred to as the "selection target substance") is selected from all of the generated droplets.

There is a requirement to separate the droplets that are handled by the fluid handling device as disclosed in NPL 1, and individually analyze the analyte contained in each droplet.

For example, as a method of separating materials in fluid, PTL 1 discloses that by floating a particle substance at a portion of a node of standing wave generated by a plurality of transducers, movement and stoppage of the particle substance can be controlled by fixing and moving of the node. According to PTL 1, by controlling the movement of the particle substance in the above-mentioned manner, it can be applied to separation of cells by FACS (Fluorescence activated cell sorting) and the like.

In addition, PTL 2 discloses that by providing a recess in a surface that is disposed opposite to the flow direction of the fluid, particle substances in fluid can be temporarily stably held in the recess, and the held particle substances can be discharged after the processing or observation.

In addition, PTL 3 discloses that a fluid mass that is deformable in accordance with the channel width and is formed to close the channel can be captured in an enlarged part in a channel formed in a spherical shape or the like.

CITATION LIST

Patent Literature

PTL 1
US Patent Application Publication No. 2002/0022261
PTL 2
US Patent Application Publication No. 2004/0224380
PTL 3
US Patent Application Publication No. 2011/0177586

Non-Patent Literature

NPL 1
C. Wyatt Shields IV, et al., Microfluidic cell sorting: a review of the advances in the separation of cells from debulking to rare cell isolation, Lab on a Chip, Vol. 15, pp. 1230-1249

SUMMARY OF INVENTION

Technical Problem

However, in the methods disclosed in PTL 1 to PTL 3, it difficult to dispense substances into individual wells or it is necessary to provide an extensive equipment to dispense them.

To solve the above-mentioned problems, an object of the present invention is to provide a fluid handling device that can easily separate a droplet, and a fluid handling system that can separate a droplet using the fluid handling device.

Solution to Problem

A fluid handling device of an embodiment of the present invention includes an inlet; an outlet; a first channel through which a droplet is movable when fluid containing the droplet is caused to flow through the first channel, the first channel being connected to the inlet and the outlet; a first chamber formed by widening the first channel, the first chamber being configured to capture the droplet moving through the first channel; and a second chamber to which the droplet captured by the first chamber is movable through the first channel, the second chamber being formed by widening the first channel. The fluid handling device is switchable between a first state and a second state by turning the fluid handling device, the first state being a state in which the first chamber is widened to an upper side than the first channel in a vertical direction, and when fluid is caused to flow through the first channel, the droplet moving through the first channel is captured by the first chamber, the second state being a state in which the second chamber is widened to the upper side than the first channel in the vertical direction, and when fluid is caused to flow through the first channel, the droplet captured by the first chamber moves to the second chamber through the first channel.

A fluid handling system of an embodiment of the present invention includes the fluid handling device; a holding mechanism configured to hold the fluid handling device; and a turning mechanism configured to turn the fluid handling device to switch the fluid handling device between the first state and the second state.

Advantageous Effects of Invention

The present invention provides a fluid handling device that can easily separate a droplet.

DESCRIPTION OF EMBODIMENTS

First Embodiment

Configuration of Fluid Handling Device

Figure 1A:
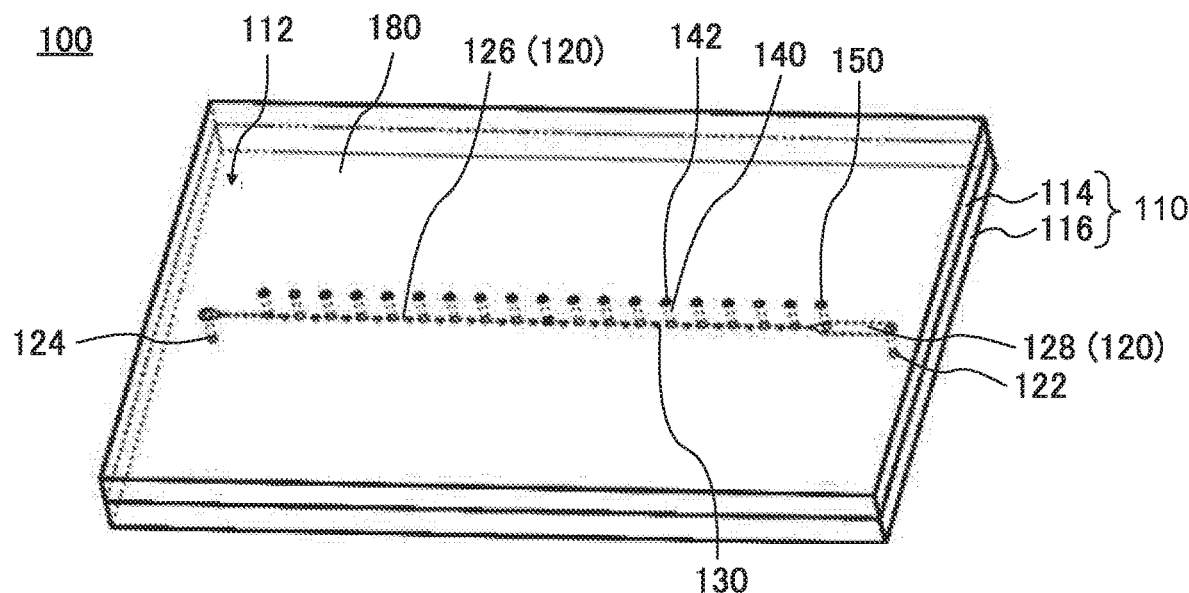
FIG. 1A is a perspective view of a fluid handling device according to a first embodiment.
Figure 1B:
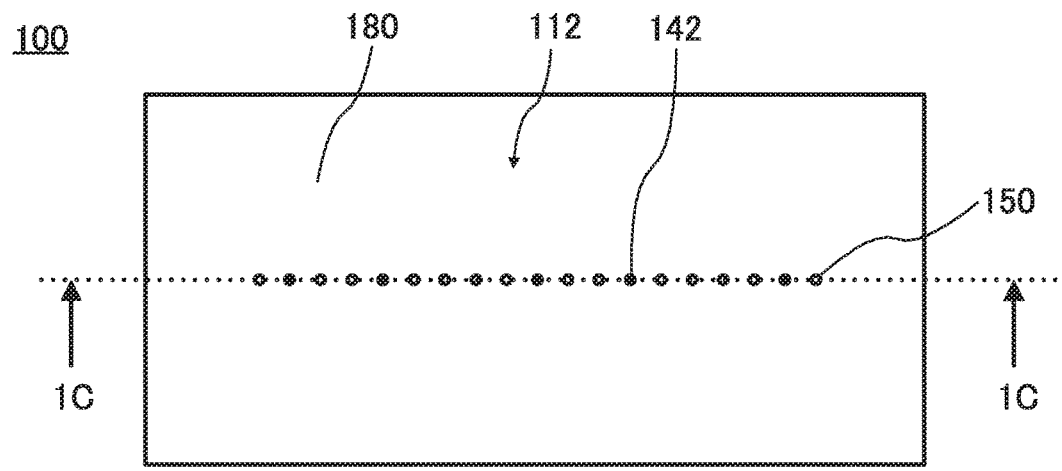
FIG. 1B is a plan view of the fluid handling device.
Figure 1C:
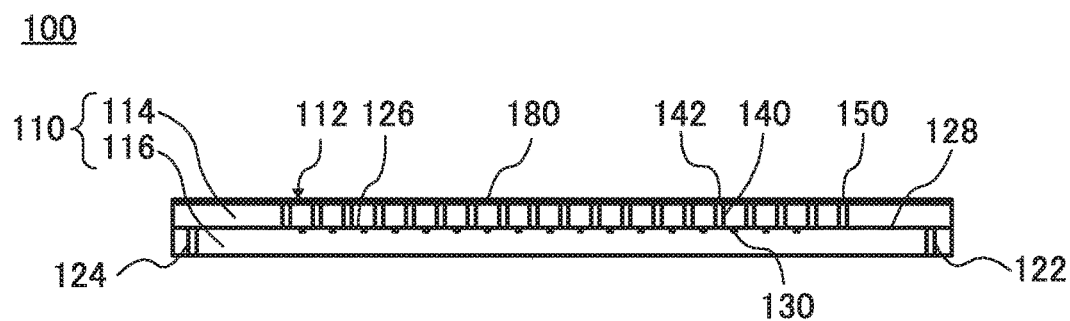
FIG. 1C is a sectional view of the fluid handling device taken along line 1C-1C illustrated in FIG. 1B.

FIGS. 1A, 1B and 1C are schematic views illustrating a configuration of fluid handling device 100 according to the present embodiment. FIG. 1A is a perspective view of fluid handling device 100, FIG. 1B is a plan view of fluid handling device 100, and FIG. 1C a sectional view of fluid handling device 100 taken along line 1C-1C illustrated in FIG. 1B. Note that, in FIGS. 1A and 1B, in a covered surface of an upper substrate, an opening covered with a cover part described later is also indicated with the solid line. In addition, hatching is omitted in FIGS. 1B and 1C. In addition, in FIG. 1C, the upper side in the drawing is the upper side in the vertical direction.

Fluid handling device 100 includes body part 110, and cover part 180 joined to surface 112 of body part 110.

Body part 110 includes first channel 120 communicating between inlet 122 and outlet 124, and a plurality of first chambers 130, a plurality of second chambers 140 and storage chamber 150. Each of first chambers 130, second chambers 140 and storage chamber 150 is formed by widening first channel 120. First channel 120 includes separation region 126 that is a channel where first chambers 130 and second chambers 140 are coupled, and introduction region 128 that is a channel where storage chamber 150 is coupled. Second chamber 140 includes opening 142 that opens from surface 112 to the outside of body part 110.

In body part 110, dispersion liquid in which a liquid drop (droplet) generated from fluid (i.e., liquid) containing a selection target substance (i.e., cells, DNA, and proteins such as enzymes), or a liquid drop (droplet) that does not contain the above-mentioned selection target substance is dispersed in mother phase liquid can flow in first channel 120 by an external force such as a pump. In the above-mentioned dispersion liquid, a liquid drop as a droplet is dispersed in mother phase liquid such as oil having low solubility in the droplet. The above-mentioned droplet may be a liquid drop of a substantially spherical shape with a diameter of 0.1 μm to 1000 μm, preferably 5 μm to 200 μm, for example. The droplet may be generated by a publicly known method. Note that the droplet may be a liquid drop that does not contain the selection target substance.

The droplet is formed of a solvent with a lighter specific gravity than the mother phase liquid. Therefore, when body part 110 is disposed such that first chamber 130 is widened to the upper side in the vertical direction from first channel 120 (i.e., widened in the direction opposite the gravity direction with respect to the connection position with the first channel) (the first state), and fluid that is liquid containing droplets is caused to flow through first channel 120, the droplet is moved from first channel 120 to first chamber 130 and captured in first chamber 130. First chamber 130 has a size that can capture only one or a small number of droplets, and therefore the droplets are separately captured in respective first chambers 130. Thereafter, when body part 110 is disposed such that second chamber 140 is widened to the upper side in the vertical direction from first channel 120 (the second state) by turning body part 110 and fluid that does not contain the droplet is caused to flow through first channel 120, the droplets captured in first chambers 130 move from first chamber 130 to first channel 120, and then move from first channel 120 to second chamber 140. Thereafter, cover part 180 is punctured, and droplets are collected from second chambers 140. In this manner, fluid handling device 100 can be easily separate droplets.

Body part 110 is formed by joining together upper substrate 114 and lower substrate 116 having thin plate shapes. In upper substrate 114, a recess of a groove shape is provided in the surface (hereinafter referred to also as simply "channel surface") that is joined to lower substrate 116. When upper substrate 114 and lower substrate 116 are joined to each other, the recess of upper substrate 114 serves as first channel 120. Note that it is also possible to adopt a configuration in which a recess of a groove shape is provided in each of the surfaces of the upper substrate and the lower substrate to be joined to each other, and the recesses provided in the surfaces of the upper substrate and the lower substrate serve as the first channel where the upper substrate and the lower substrate are joined to each other such that the recesses match each other. Introduction region 128 is formed in one end portion of first channel 120, and separation region 126 is formed in the remaining region of first channel 120.

Upper substrate 114 includes, in the recess of the groove shape, a plurality of substantially columnar spaces extending through upper substrate 114 in the direction (in the present embodiment, the thickness direction of upper substrate 114) toward the surface (hereinafter referred to also as simply "covered surface") on which lower substrate 116 is not joined from the region that serves as the separation region when first channel 120 is formed. The plurality of substantially columnar spaces serves as second chambers 140 when upper substrate 114 and lower substrate 116 are joined to each other, and cover part 180 is joined to the covered surface. In addition, upper substrate 114 includes, in the recess of the groove shape, one substantially columnar space extending through upper substrate 114 in the direction (in the present embodiment, the thickness direction of upper substrate 114) toward the covered surface from the region that serves as the introduction region when first channel 120 is formed. The one substantially columnar space serves as storage chamber 150 when upper substrate 114 and lower substrate 116 are joined to each other, and cover part 180 is joined to the covered surface.

Lower substrate 116 includes, in the surface configured to be joined to upper substrate 114, a plurality of substantially columnar spaces formed in the direction (in the present embodiment, the thickness direction of lower substrate 116) toward the surface on which upper substrate 114 is not joined from the region serving as a channel surface of first channel 120 in the joined state. The plurality of substantially columnar spaces serves as first chambers 130 when lower substrate 116 is joined to upper substrate 114. In addition, lower substrate 116 includes, in the surface configured to be joined to upper substrate 114, a pair of substantially columnar spaces extending through lower substrate 116 in the direction toward the surface on which upper substrate 114 is not joined from the region serving as a channel surface of first channel 120 in the joined state. When lower substrate 116 is joined to upper substrate 114, the pair of substantially columnar spaces respectively serve as inlet 122 and outlet 124.

Upper substrate 114 and lower substrate 116 are formed of a resin material such as polyester such as polyethylene terephthalate, polycarbonate, acrylic resin such as polymethylmethacrylate, polyvinyl chloride, polyolefin such as polyethylene, polypropylene and cycloolefin resin, polyether, polystyrene, silicone resin, and various elastomers, for example. Upper substrate 114 and lower substrate 116 may be formed of the same material or different materials as long as joining described later can be performed.

While upper substrate 114 and lower substrate 116 may be thermally bonded to each other in the region except in first channel 120, it is preferable to bond them using an epoxy adhesive agent or the like from the viewpoint of suppressing deformation due to heat during the bonding and the like.

Cover part 180 is joined to surface 112 of body part 110 so as to cover opening 142 of second chamber 140 and the opening of storage chamber 150 at the covered surface.

Cover part 180 is formed of a material that is easy to puncture with a pipette, such as acrylic resin, cyclic olefin homopolymer resin (COP), cyclic olefin copolymerization resin (COC), olefin elastomer such as propylene elastomer, polyethylene and silicone rubber, for example.

While cover part 180 may be thermally bonded to surface 112 of body part 110 in the region where opening 142 of second chamber 140 and the opening of storage chamber 150 at the covered surface are not covered, it is preferable that cover part 180 be bonded to surface 112 of body part 110 with an epoxy adhesive agent or the like from the viewpoint of suppressing deformation of body part 110 and cover part 180 due to heat during the bonding.

First channel 120 is a channel through which fluid containing a droplet flows. Conduction inlet 122 and outlet 124 communicated with the outside of the body part are provided at both end portions of first channel 120, and thus fluid containing a droplet, fluid used for separation of a droplet and the like can flow from inlet 122 to outlet 124. First channel 120 includes separation region 126 where separation of a droplet is performed, and introduction region 128 where a droplet included in fluid introduced from inlet 122 is temporarily stored. In separation region 126, first chambers 130 and second chambers 140 are formed by partially widening separation region 126.

Separation region 126 is a channel whose cross-sectional area perpendicular to the flow direction is smaller than the cross-sectional area of the droplet to be separated, which limits free movement of the droplet. Specifically, the cross-sectional area of separation region 126 in the direction perpendicular to the flow direction of the fluid is a value that allows, to flow therethrough, a droplet slightly deformed by increasing the flow velocity (flow pressure) of the fluid flowing in first channel 120. For example, the cross-sectional area of separation region 126 in the direction perpendicular to the flow direction of the fluid may be set to 16.5% to 90% of the cross-sectional area of the droplet to be separated. For example, in the case where the cross-sectional area of the droplet is 7850 μm2 (the droplet has a particle size of 100 μm), the cross-sectional area of separation region 126 is 1300 μm2 to 7065 μm2. In the case where the particle size of the droplet 100 μm, the minimum value of the width and depth of separation region 126 in the cross-section perpendicular to the flow direction is preferably 13 μm or greater, more preferably 20 μm or greater, still more preferably 70 μm from the viewpoint of preventing damage to the droplet. In other words, the minimum value of the width and depth of separation region 126 in the cross-section perpendicular to the flow direction of the fluid is preferably 13/100 or greater, more preferably 1/5 or greater, still more preferably 7/10 or greater, of the particle size of the droplet. The length of separation region 126 is not limited as long as a sufficient amount of droplet can be allowed to flow and can be separated. For example, the length of separation region 126 is preferably 1 mm to 10 cm, more preferably 1 cm to 10 cm. In separation region 126, the cross-sectional shape of the channel may be any shape such as a circular shape, an elliptical shape, a square shape, and a rectangular shape. Note that the "cross-sectional area of the droplet" used herein means an area of a cross-section passing through the center of the droplet equivalent to a sphere in the state where the droplet is not deformed by an external force.

Introduction region 128 is a channel whose cross-sectional area perpendicular to the flow direction of the fluid is sufficiently larger than the cross-sectional area of the droplet to be separated, with a channel diameter that allows for free movement of the droplet. Introduction region 128 is communicated with inlet 122, and temporarily stores a droplet introduced from inlet 122. While the channel diameter and length of introduction region 128 are not limited, the width in the direction in which the channel diameter is minimized (the width in the direction perpendicular to the joint surface between upper substrate 114 and lower substrate 116) may be 10 μm to 300 μm, the width in the direction in which the channel diameter is maximized (the width in the direction that is parallel to the joint surface between upper substrate 114 and lower substrate 116 and is perpendicular to the flow direction of the fluid) may be 0.1 mm to 20 mm, and the length may be 1 mm to 10 mm, for example.

Note that, from the viewpoint of preventing damage to a droplet deformed under a pressure, the boundary region between introduction region 128 and separation region 126 is preferably a channel having a shape whose width (the width in the delivery direction that is parallel to the joint surface between upper substrate 114 and lower substrate 116) is continuously and gradually reduced with both side surfaces having curved shapes.

First chamber 130 is a widened space of separation region 126 of first channel 120, and is a closed space that opens at separation region 126 of first channel 120. In the first state where body part 110 is disposed such that first chamber 130 is oriented on the upper side than first channel 120 in the vertical direction, first chamber 130 moves droplets flowing in first channel 120 by buoyancy to capture the droplets. First chamber 130 has a size that can house (capture) a small number of droplets, or more specifically, one to five droplets. From the viewpoint of increasing the ease of separation of the droplet, it is preferable that first chamber 130 have a size that can house (capture) only one droplet. When first chamber 130 has a size that can house one droplet, the maximum value of the cross-sectional area of first chamber 130 is preferably greater than 100% and smaller than 160%, more preferably 100% to 150%, of the cross-sectional area of the droplet, for example. Note that the cross-sectional area of first chamber 130 means the cross-sectional area of first chamber 130 in the cross-section perpendicular to the flow direction of the fluid of separation region 126. In addition, the diameter of the opening of first chamber 130 at separation region 126 depends on the particle size of the droplet and the flow velocity, but may be adjusted within a range of appropriately 100% to 500% of the particle size of the droplet when the flow velocity of the droplet is sufficiently low. In addition, the depth of first chamber 130 (the height from separation region 126 of first channel 120 in the first state) may be 100% to 150% of the particle size of the droplet.

For example, the diameter of the opening of first chamber 130 at separation region 126 may be 100 µm to 150 µm in the case where the particle size of the droplet is 100 µm and the flow velocity of the droplet is 20 µm/s to 2000 µm/s (a sufficiently low flow velocity), or may be 150 µm to 500 µm in the case where the particle size of the droplet is 100 µm and the flow velocity of the droplet is 2000 µm/s to 10 mm/s (a high flow velocity). For example, the depth of first chamber 130 (the height from separation region 126 of first channel 120 in the first state) may be 100 µm to 150 µm in the case where the particle size of the droplet is 100 µm.

First chamber 130 has a substantially columnar shape in the present embodiment, but may be a space having any shape such as a partial sphere, a rectangular prism, and a cube. From the viewpoint of preventing damage to a droplet deformed under a pressure, it is preferable that an end portion of the opening of first chamber 130 at first channel 120 (separation region 126) be chamfered. Note that, as used herein, the term chamfering encompasses both R-chamfering (the chamfered surface has a curved surface) and C-chamfering (the chamfered surface has a flat surface). In addition, preferably, the shape of the opening of first chamber 130 at separation region 126 of first channel 120 is a circular shape in the case where the flow velocity of the droplet is sufficiently low, and is an elliptical shape whose long axis is parallel to the delivery direction of the liquid in first channel 120 in the case where the flow velocity of the droplet is high.

Second chamber 140 is a substantially columnar space that opens at separation region 126 of first channel 120, has an opening diameter greater than the channel diameter of first channel 120 and the opening diameter of first chamber 130, and extends toward surface 112. Second chamber 140 preferably has a size with which the droplet moved into the second chamber 140 can be collected with a pipette or the like by puncturing cover part 180 to open it to the outside. For example, second chamber 140 may be a space having a diameter (the diameter of the circular cross-sectional shape formed in the direction parallel to surface 112 and the flow direction of first channel 120) of 200 µm to 35 mm.

As viewed in the flow direction of the fluid of first channel 120, the widening directions of first chamber 130 and second chamber 140 are different from each other. In other words, first chamber 130 and second chamber 140 are formed by widening separation region 126 of first channel 120 in respective directions different from each other. Furthermore, second chamber 140 opens to separation region 126 of first channel 120 such that the opening angle in the direction orthogonal to the flow direction of the first channel is different from first chamber 130. From the viewpoint of reducing the amount of the droplet that is moved in the second state and captured in first chamber 130, the difference between the opening angles of first chamber 130 and second chamber 140 at the first channel 120 when separation region 126 is viewed in the flow direction of the fluid is preferably 90 degrees to 180 degrees, more preferably 135 degrees to 180 degrees, still more preferably 180 degrees.

Note that second chamber 140 has a columnar shape in the present embodiment, but may be a space having any shape such as a square column and a polygonal column. From the viewpoint of increasing the ease of collection of the droplet, the cross-sectional shape of second chamber 140 from first channel 120 (separation region 126) to surface 112 be constant or gradually increase from first channel 120 (separation region 126) to surface 112. In addition, from the viewpoint of preventing damage to a droplet deformed under a pressure, it is preferable that the end portion of the opening of second chamber 140 at first channel 120 (separation region 126) be chamfered.

First chamber 130 and second chamber 140 are open to first channel 120 and alternate in the flow direction of the fluid. From the viewpoint of increasing the ease of operation of fluid handling device 100, it is preferable that first chambers 130 and second chambers 140 are disposed such that their openings are disposed at constant intervals. First chambers 130 and second chambers 140 may be disposed such that their openings are disposed at an interval of 100 µm to 10 mm, for example.

Storage chamber 150 is a substantially columnar space extending toward surface 112 from introduction region 128 of first channel 120. Storage chamber 150 temporarily stores a droplet introduced from inlet 122. The widening direction of storage chamber 150 is different from the widening direction of first chamber 130 as viewed in the flow direction of the fluid of the first channel. That is, storage chamber 150 is formed by widening introduction region 128 of first channel 120 in the direction different from the direction in which first chamber 130 is widened from separation region 126. Furthermore, storage chamber 150 opens to first channel 120 such that the opening angle in the direction orthogonal to the flow direction of the first channel is different from first chamber 130. The difference between the opening angles of storage chamber 150 and second chamber 140 at first channel 120 is preferably 90 degrees to 180 degrees, more preferably 135 degrees to 180 degrees, still more preferably 180 degrees. In addition, the widening direction of storage chamber 150 is different from the widening direction of inlet 122 as viewed in the flow direction of the fluid of the first channel. That is, storage chamber 150 opens to introduction region 128 of first channel 120 such that the opening angle in the direction orthogonal to the flow direction of the first channel is different from inlet 122. The difference between the opening angles of storage chamber 150 and inlet 122 at introduction region 128 of first channel 120 is preferably 90 degrees to 180 degrees, more preferably 135 degrees to 180 degrees, still more preferably 180 degrees.

From the viewpoint of moving and storing more introduced droplets into storage chamber 150, it is preferable that storage chamber 150 have an opening diameter greater than the diameter of the droplet. On the other hand, from the viewpoint of allowing movement of droplets from storage chamber 150 to the first channel, it is preferable to provide an opening diameter that is equal to or smaller than the width of introduction region 128 (the width in the direction perpendicular to the flow direction in the introduction region). For example, storage chamber 150 may have an opening diameter whose ratio with respect to the width of introduction region 128 of first channel 120 (the width in the direction perpendicular to the flow direction in the introduction region) is ½ to 1.

Note that storage chamber 150 may be a closed space having a substantially columnar shape without penetrating to surface 112.

From the viewpoint of increasing the ease of production and operation of body part 110, it is preferable that the opening angles of first chamber 130 and inlet 122 at first channel 120 in the direction orthogonal to the flow direction of the first channel be substantially the same. Likewise, it is preferable that the opening angles of second chamber 140 and storage chamber 150 at first channel 120 in the direction orthogonal to the flow direction of the first channel be substantially the same. In addition, it is preferable that the difference of the opening angles of first chamber 130 and inlet 122 to first channel 120 and the difference of the opening angles of second chamber 140 and storage chamber 150 to first channel 120 be both 180 degrees.

Operation of Fluid Handling Device

Fluid handling device 100 is used in the state where cover part 180 is joined on surface 112 of body part 110.

Figure 2A:
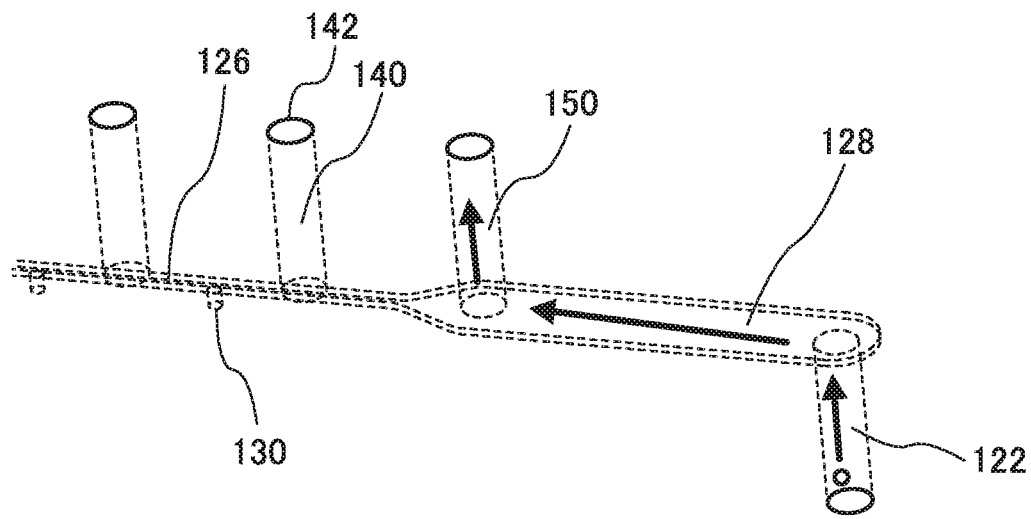
FIG. 2A is an enlarged schematic view of a region around the introduction region and illustrates a movement of droplets when fluid containing a plurality of droplets is introduced to a first channel.
Figure 2B:
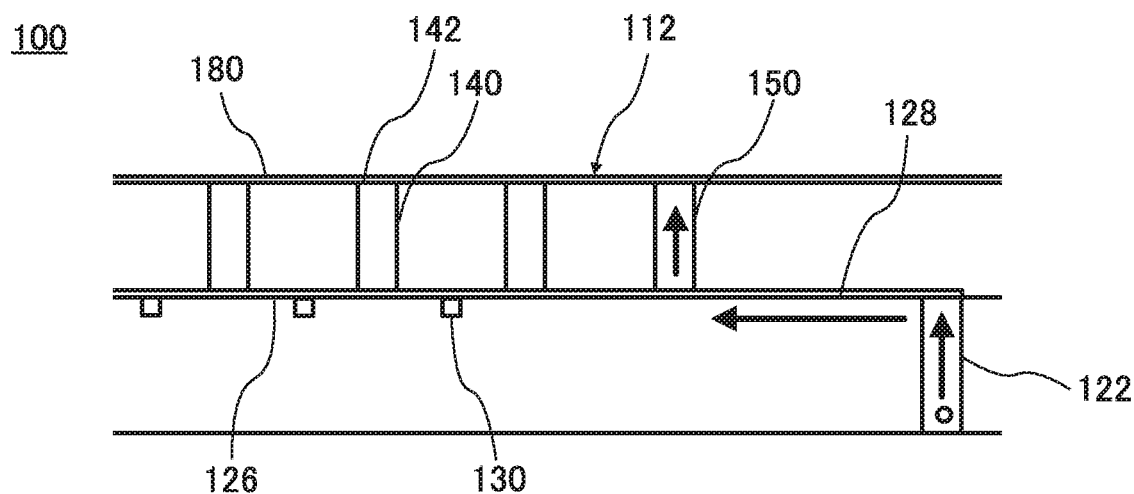
FIG. 2B is an enlarged sectional view of a region around the introduction region taken along line 1C-1C illustrated in FIG. 1B and illustrates a movement of droplets when fluid containing a plurality of droplets is introduced to the first channel.

First, fluid handling device 100 is set at an angle at which storage chamber 150 is on the upper side than first channel 120 (introduction region 128) in the vertical direction (the second state), and fluid containing a plurality of droplets is introduced from inlet 122 to first channel 120. FIGS. 2A and 2B are schematic views illustrating a movement of droplets at this time (with arrows in the drawing). FIG. 2A is an enlarged schematic view of a region around introduction region 128, and FIG. 2B is an enlarged sectional view of a region around introduction region 128 taken along line 1C-1C illustrated in FIG. 1B. Note that opening 142 of second chamber 140 is covered with cover part 180 although it is indicated with the solid line in FIG. 2A. In addition, in FIG. 2B, the upper side in the drawing is the upper side in the vertical direction.

An introduced fluid component flows through first channel 120 from introduction region 128 to separation region 126, and is discharged from outlet 124. On the other hand, the movement of the droplet from introduction region 128 to separation region 126 is limited, and the droplet is retained at introduction region 128. At this time, the droplet moves from introduction region 128 to storage chamber 150 by its buoyancy. When the droplet moves to storage chamber 150, the droplet is not easily retained at the boundary region between introduction region 128 and separation region 126. In this manner, storage chamber 150 can suppress flow failure of the fluid component due to the retained droplet, separation failure due to movement into second chamber 140 of the retained droplet pushed by a droplet introduced later, and the like.

The flow velocity of the introduced droplet at the time of introducing the droplet from inlet 122 to first channel 120 (introduction region 128) may be set to any value as long as the movement of the droplet to separation region 126 due to deformation of the droplet is not easily caused. For example, the flow velocity of the droplet introduced at this time may be 20 µm/s to 2000 µm/s.

Figure 3A:
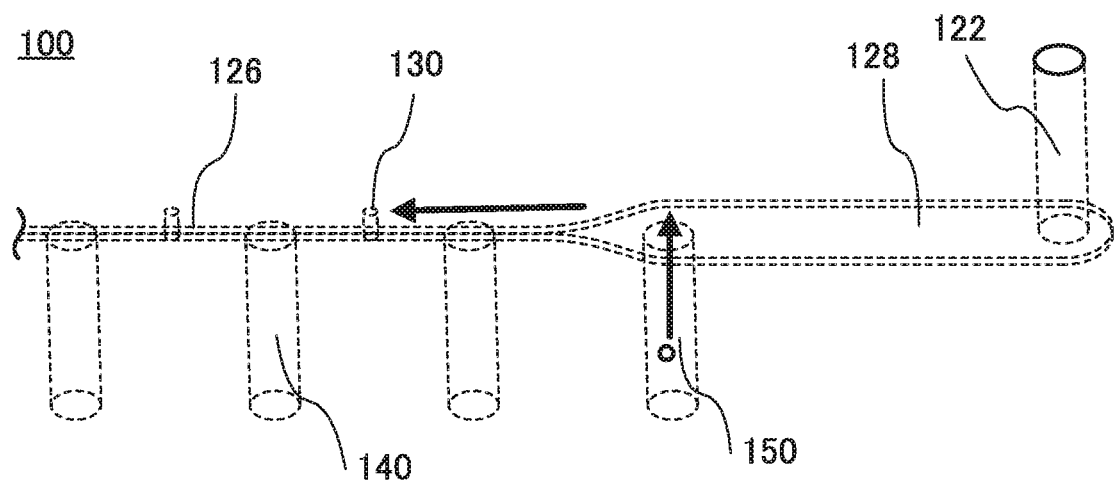
FIG. 3A is an enlarged schematic view of a region around the introduction region and illustrates a movement of droplets when droplets are moved to a first chamber.
Figure 3B:
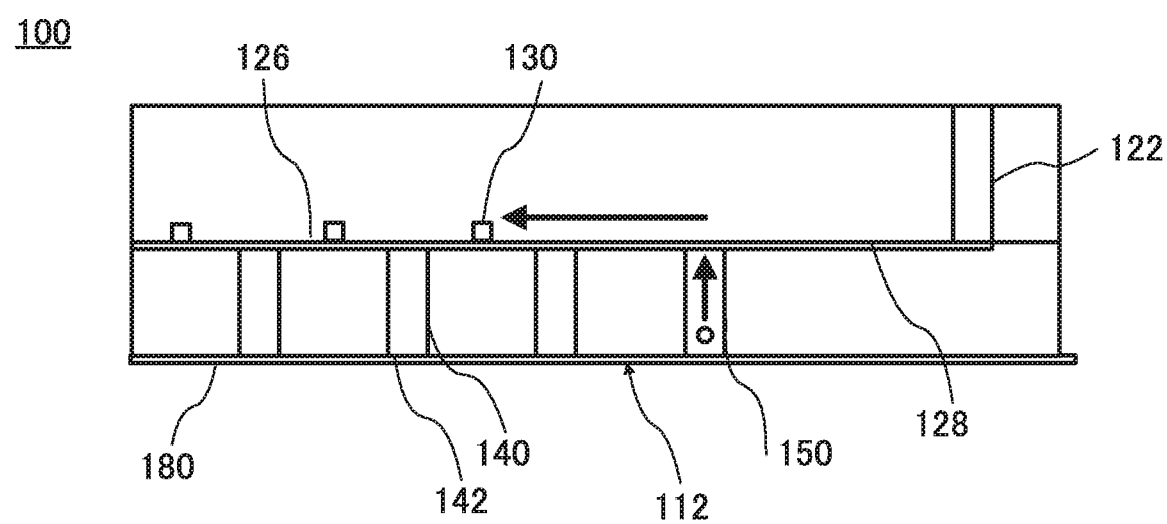
FIG. 3B is an enlarged sectional view of a region around the introduction region taken along line 1C-1C illustrated in FIG. 1B and illustrates a movement of droplets when droplets are moved to the first chamber.

Next, fluid handling device 100 is turned about an axis parallel to first channel 120 as a turning axis to set fluid handling device 100 at an angle at which first chamber 130 is on the upper side than first channel 120 (separation region 126) in the vertical direction (the first state). In this state, fluid that does not contain the droplet is introduced from inlet 122 to first channel 120. FIGS. 3A and 3B are schematic views illustrating a movement of droplets at this time (with arrows in the drawing). FIG. 3A is an enlarged schematic view of a region around introduction region 128, and FIG. 3B is an enlarged sectional view of a region around introduction region 128 taken along line 1C-1C illustrated in FIG. 1B. Note that, in FIG. 3B, the upper side in the drawing is the upper side in the vertical direction.

An introduced fluid component presses the droplet coming up from storage chamber 150 to introduction region 128 of first channel 120 as a result of the turning of fluid handling device 100, to move it to outlet 124 through separation region 126. When the droplet moving through separation region 126 reaches the portion where first chamber 130 is formed, the droplet moves to first chamber 130 by its buoyancy. In this manner, the droplet is captured by first chamber 130. It should be noted that, since each first chamber 130 can house (capture) only one or a small number of droplets, succeeding droplets sequentially move through separation region 126 in the direction of outlet 124, and are captured in the next first chamber 130 where no droplet is captured. In this manner, a plurality of droplets is sequentially captured in the plurality of first chambers 130 from the inlet 122 side to the outlet 124 side.

The flow velocity of the introduced droplet at the time when the droplet is moved from introduction region 128 (storage chamber 150) to separation region 126 may be set to any value as long as a droplet can be slightly deformed and moved from introduction region 128 to separation region 126, which is a channel having a narrower width. For example, the flow velocity of the droplet introduced at this time is 20 µm/s to 2000 µm/s. The flow velocity of the droplet moving through separation region 126 is higher than the flow velocity of the introduced droplet at the time of introducing the droplet from inlet 122 to first channel 120 (introduction region 128).

Figure 4A:
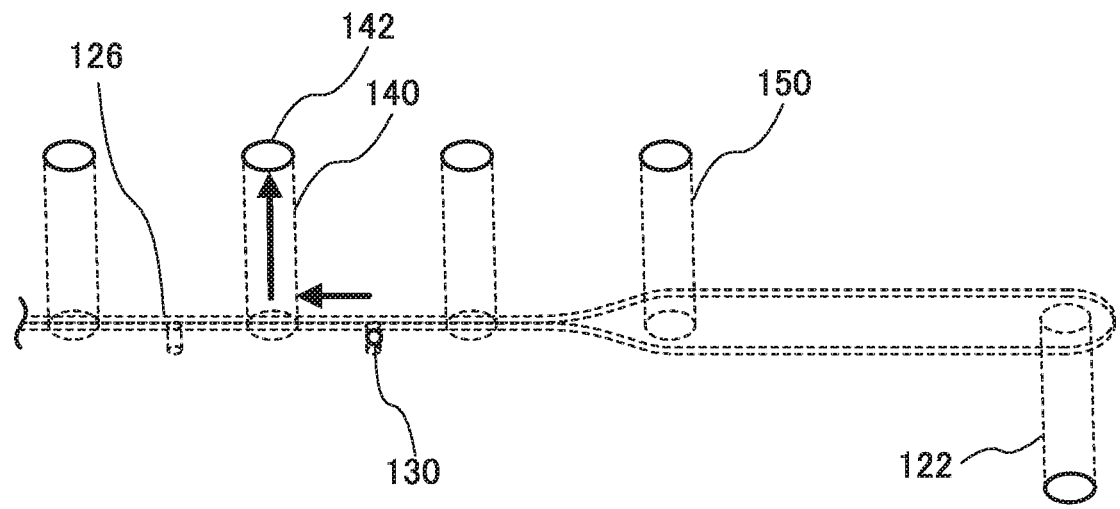
FIG. 4A is an enlarged schematic view of a region around the introduction region and illustrates a movement of droplets when droplets are moved to the second chamber.
Figure 4B:
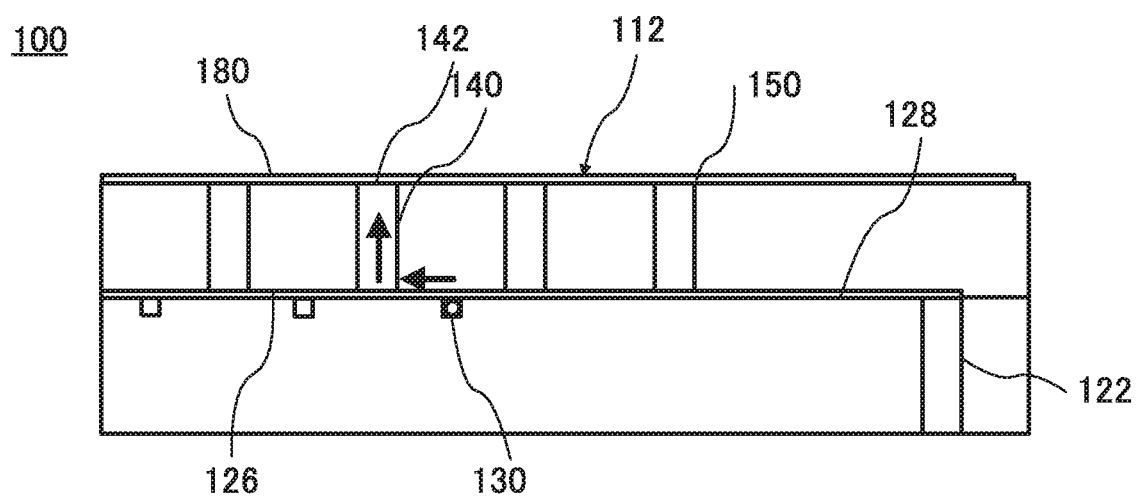
FIG. 4B is an enlarged sectional view of a region around the introduction region taken along line 1C-1C illustrated in FIG. 1B and illustrates a movement of droplets when droplets are moved to the second chamber.

Next, fluid handling device 100 is again turned about an axis parallel to first channel 120 as a turning axis to set fluid handling device 100 at an angle at which second chamber 140 is on the upper side than first channel 120 (separation region 126) in the vertical direction (the second state). In this state, fluid that does not contain the droplet is introduced from inlet 122 to first channel 120. FIGS. 4A and 4B are schematic views illustrating a movement of droplets at this time (with arrows in the drawing). FIG. 4A is an enlarged schematic view of a region around introduction region 128, and FIG. 4B is an enlarged sectional view of a region around introduction region 128 taken along line 1C-1C illustrated in FIG. 1B. Note that opening 142 of second chamber 140 and the opening of storage chamber 150 are covered with cover part 180 although it is indicated with the solid line in FIG. 4A. In addition, in FIG. 4B, the upper side in the drawing is the upper side in the vertical direction.

An introduced fluid component presses the droplet coming up from first chamber 130 to separation region 126 of first channel 120 as a result of the turning of fluid handling device 100, to move it to outlet 124 through separation region 126. When the droplet moving through separation region 126 reaches the portion where second chamber 140 is formed, the droplet moves to second chamber 140 by its buoyancy. In this manner, the droplet moves to second chamber 140. At this time, since first chamber 130 and second chamber 140 are alternately disposed to open to first channel 120, the droplet captured in a certain first chambers 130 moves through separation region 126 in the direction of outlet 124 to the next opening second chamber 140. That is, the droplets captured in first chambers 130 move to corresponding second chambers 140. Thus, droplets individually captured in first chamber 130 can individually move to second chambers 140 without being again mixed.

The flow velocity of the introduced droplet at the time when the droplet is moved from first chamber 130 to second chamber 140 may be set to any value as long as a droplet can be slightly deformed and moved in separation region 126, which is a channel having a smaller cross-sectional area. For example, the flow velocity of the droplet introduced at this time may be 60 μm/s to 2000 μm/s.

Finally, cover part 180 is punctured without changing the angle of fluid handling device 100 (the second state), and the droplet moved to each second chamber 140 is removed with a pipette or the like. Since each second chamber 140 houses only one or a small number of droplets, the droplets can be easily individually collected.

Effect

With fluid handling device 100 according to the present embodiment, droplets can be easily separated.

Second Embodiment

Configuration of Fluid Handling Device

Figure 5A:
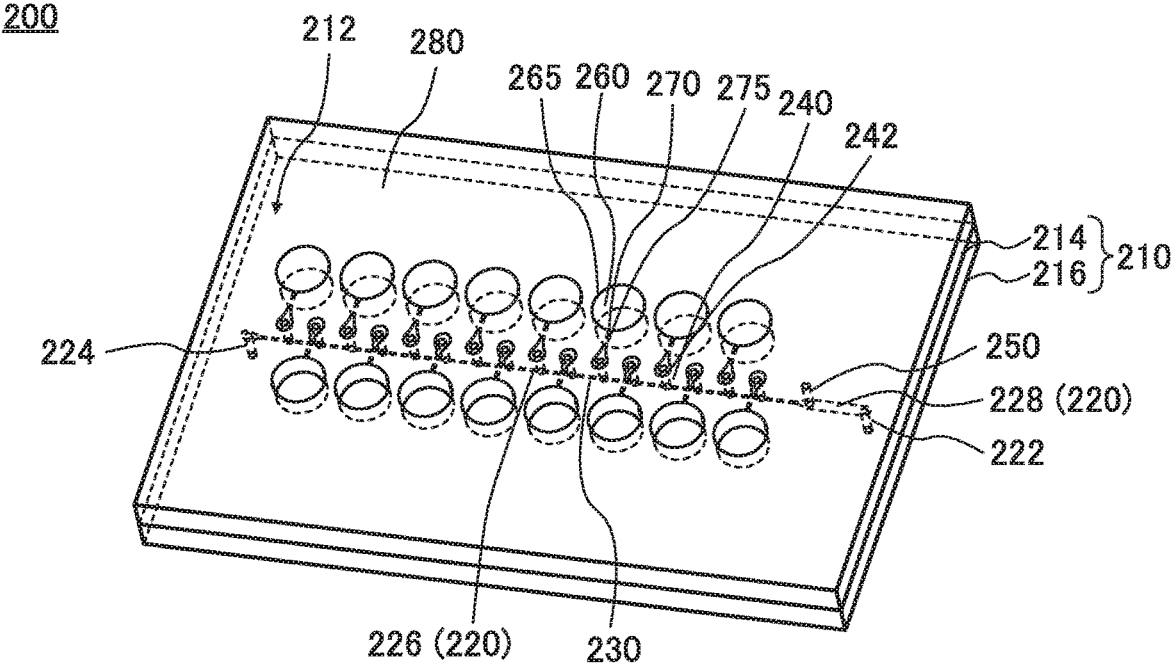
FIG. 5A is a perspective view of a fluid handling device according to a second embodiment.
Figure 5B:
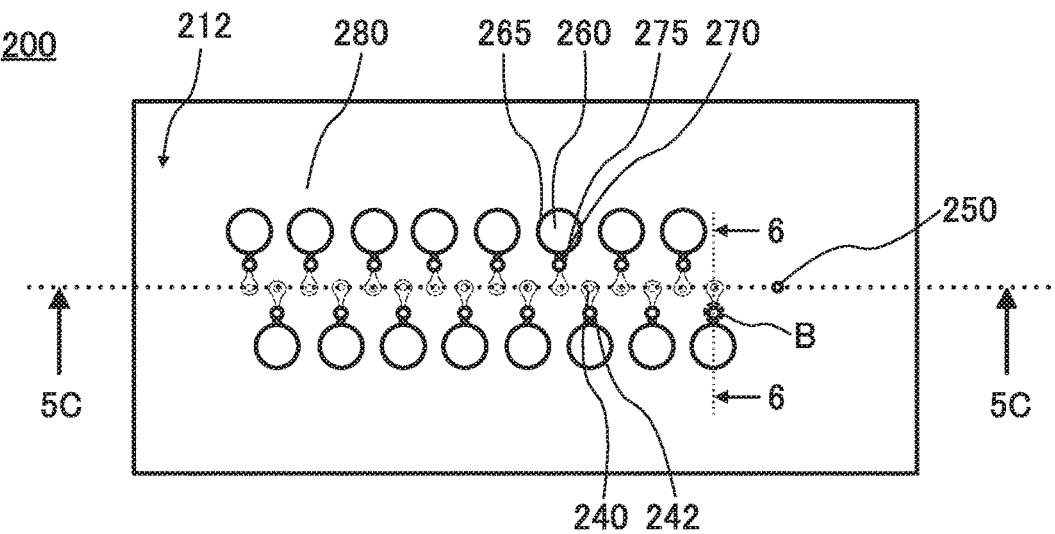
FIG. 5B is a plan view of the fluid handling device.
Figure 5C:
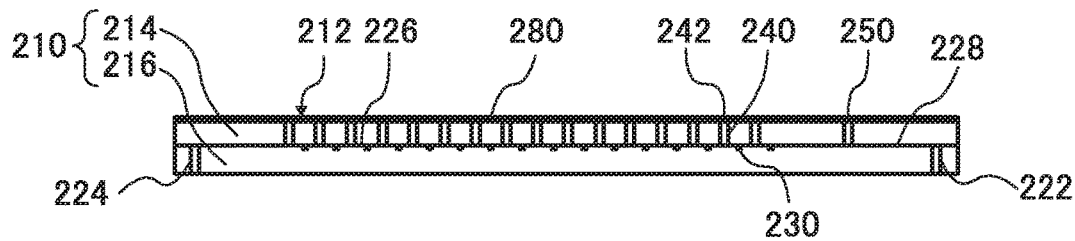
FIG. 5C is a sectional view of the fluid handling device taken along line 5C-5C illustrated in FIG. 5B.
Figure 6:
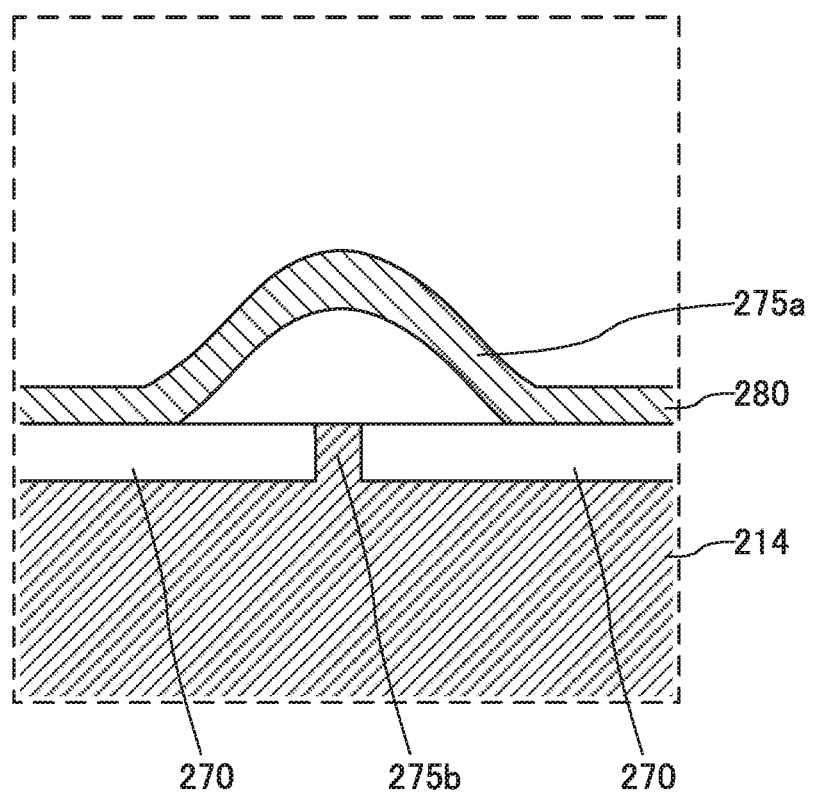
FIG. 6 is an enlarged sectional view of region B of FIG. 5B taken along line 6-6.

FIGS. 5A, 5B and 5C are schematic views illustrating a configuration of fluid handling device 200 according to the present embodiment. FIG. 5A is a perspective view of fluid handling device 200, FIG. 5B is a plan view of fluid handling device 200, FIG. 5C is a sectional view of fluid handling device 200 taken along line 5C-5C illustrated in FIG. 5B. Note that, in FIG. 5C, the upper side in the drawing is the upper side in the vertical direction. FIG. 6 is an enlarged sectional view of region B of FIG. 5B taken along line 6-6. Note that the opening of storage chamber 250, reception part 242 of second chamber 240, valve 275 and a part of second channel 270 are covered with cover part 280 although they are indicated with the solid line FIGS. 5A and 5B.

Fluid handling device 200 includes body part 210, and cover part 280 joined to one surface 212 of body part 210.

Body part 210 includes first channel 220 communicating between inlet 222 and outlet 224, a plurality of first chambers 230, a plurality of second chambers 240, storage chamber 250, third chamber 260 communicated with second chamber 240, second channel 270 communicating between second chamber 240 and third chamber 260, and valve 275 provided in second channel 270. First chambers 230, second chambers 240 and storage chamber 250 are spaces that are open to first channel 220. First channel 220 includes separation region 226 where first chambers 230 and second chambers 240 are provided and introduction region 228 where storage chamber 250 is provided. Separation region 226 is a channel having a smaller cross-sectional area in the cross-section perpendicular to the flow direction of the fluid. Introduction region 228 is a channel having a larger cross-sectional area in the cross-section perpendicular to the flow direction of the fluid. Third chamber 260 includes opening 265 that opens to the outside of body part 210 from surface 212.

Body part 210 allows dispersion liquid of droplets to flow through first channel 220 by an external force such as a pump. The droplet and the dispersion liquid thereof may be the same as those of the first embodiment, and therefore detailed description thereof is omitted.

Also in the present embodiment, when body part 210 is disposed such that first chamber 230 is oriented on the upper side than first channel 220 in the vertical direction (the first state) and fluid containing a droplet is caused to flow through first channel 220, the droplet is moved from first channel 220 to first chamber 230 and captured in first chamber 230. First chamber 230 has a size that can capture only one or a small number of droplets, and therefore the droplets are separately captured in respective first chambers 230. Thereafter, body part 210 is turned about an axis parallel to first channel 220 as a rotation axis to set body part 210 such that second chamber 240 is oriented on the upper side than first channel 220 in the vertical direction (the second state), and fluid that does not contain the droplet is caused to flow through first channel 220, the separately captured droplets move from first chamber 230 to first channel 220, and then move from first channel 220 to second chamber 240. Thereafter, when valve 275 is released to cause the fluid that does not contain the droplet first channel 220 to flow, the droplet moved to second chamber 240 moves from reception part 242 of second chamber 240 to third chamber 260 through second channel 270 by the flow of the fluid coming from first channel 220 (separation region 226) to second chamber 240. Finally, the droplet is collected from each third chamber 260. In this manner, fluid handling device 200 can easily separate the droplets.

Body part 210 is formed by joining upper substrate 214 and lower substrate 216 to each other. Also in the present embodiment, when upper substrate 214 and lower substrate 216 are joined to each other at the channel surface, the recess of upper substrate 214 serves as first channel 220, as in the first embodiment.

Upper substrate 214 includes, in the recess of the groove shape, a plurality of substantially columnar spaces that extend toward the covered surface through the upper substrate from a region that serves as the separation region when first channel 220 is formed. The plurality of substantially columnar spaces serves as second chambers 240 when upper substrate 214 and lower substrate 216 are joined to each other and cover part 280 is joined to the covered surface. The opening of the substantially columnar space on the covered surface side is reception part 242 having a larger width. A plurality of wells opening to the covered surface side, each of which is paired with the substantially columnar space serving as second chamber 240, are formed in upper substrate 214, and a recess of a groove shape communicated with each well is formed in the covered surface from one end portion of each reception part 242. When cover part 280 is joined to the covered surface of upper substrate 214, the well serves as third chamber 260. When cover part 280 is joined to the covered surface of upper substrate 214, the recess of the groove shape formed in the covered surface serves as second channel 270.

In addition, upper substrate 214 includes, in the recess of the groove shape, one substantially columnar space extending through the upper substrate toward the covered surface from a region that serves as the introduction region when is first channel 220 is formed. When upper substrate 214 is joined to lower substrate 216 and cover part 280 is joined to the covered surface, the one substantially columnar space serves as storage chamber 250.

Lower substrate 216 includes a plurality of substantially columnar spaces formed from the surface to which upper substrate 214 is joined toward the surface to which upper substrate 214 is not joined, without penetrating lower substrate 216. When lower substrate 216 is joined to upper substrate 214, the plurality of substantially columnar spaces serves as first chambers 230. In addition, lower substrate 216 includes a pair of substantially columnar spaces penetrating the upper substrate from the surface to which upper substrate 214 is joined toward the surface to which upper substrate 214 is not joined. When lower substrate 216 is joined to upper substrate 214, the pair of substantially columnar spaces respectively serve as inlet 222 and outlet 224.

The material, joining method and the like of upper substrate 214 and lower substrate 216 may be the same as those of the first embodiment, and therefore the detailed description thereof is omitted.

The material, joining method and the like of cover part 280 may be the same as those of the first embodiment, and therefore the detailed description thereof is omitted.

First channel 220 is a channel through which fluid containing a droplet flows. First channel 220 includes separation region 226 where separation of a droplet is performed and introduction region 228 where the droplet included in the fluid introduced from inlet 222 is temporarily stored. The configurations of first channel 220, separation region 226 and introduction region 228 may be the same as those of the first embodiment, and therefore the detailed description thereof is omitted.

Also, the configuration of first chamber 230 may be the same as that of the first embodiment, and therefore the detailed description thereof is omitted.

Second chamber 240 is a substantially columnar space that opens to separation region 226 of first channel 220 and extends to surface 212. In the present embodiment, to collect the droplet from third chamber 260, second chamber 240 does not required to have a size that allows for collection of droplets with a pipette or the like. It should be noted that, preferably, second chamber 240 has a size that allows for free movement of the droplet. For example, second chamber 240 may be a space having a diameter (a radius of a circular cross-section formed in a direction parallel to the flow direction of the first channel) of 200 µm to 5 mm.

As in the first embodiment, second chamber 240 opens to separation region 226 of first channel 220 such that the opening angle in the direction orthogonal to the flow direction of the first channel is different from first chamber 230.

In addition, as in the first embodiment, first chamber 230 and second chamber 240 are alternately disposed to open to first channel 220.

In the present embodiment, second chamber 240 includes reception part 242 communicated with second channel 270 disposed on the surface 212 side.

Reception part 242 is a substantially columnar space provided facing the surface 212 side at the opening of second chamber 240. Preferably, reception part 242 has a depth (the distance from the opening at surface 212 to the concentric bottom surface of reception part 242) and a diameter (the diameter of the opening in a plane parallel to surface 212) that can house a droplet and can allow for free movement of the droplet. For example, reception part 242 may be a space having a depth of 50 µm to 500 µm, and a diameter of 300 µm to 5.1 mm. In addition, from the viewpoint of preventing damage to a droplet deformed under a pressure, it is preferable that, in reception part 242, the end portion of the opening to second chamber 240 be chamfered.

Third chamber 260 is a space of a well shape disposed for each second chamber 240 and opens at surface 212. In plan view of fluid handling device 200 (body part 210), third chamber 260 is disposed at a position different from first channel 220. Therefore, third chamber 260 does not communicate with first channel 220. Preferably, third chamber 260 has a size with which the droplet moved into third chamber 260 can be collected with a pipette or the like. For example, third chamber 260 may be a space having a diameter (a radius of a circular cross-section formed in the direction parallel to the flow direction of the first channel) of 1 mm to 35 mm.

Third chamber 260 has a columnar shape in the present embodiment, but may be a space having any shape such as a square column and a polygonal column. From the viewpoint of increasing the ease of collection of the droplet, it is preferable that the cross-sectional shape of third chamber 260 from the bottom surface of third chamber 260 to surface 212 be constant, or gradually increase from the bottom surface of third chamber 260 to surface 212. In addition, from the viewpoint of preventing damage to a droplet deformed under a pressure, it is preferable that the end portion of the opening of third chamber 260 at second channel 270 be chamfered.

Second channel 270 is a channel communicating between reception part 242 and third chamber 260. Each second channel 270 communicates between the pair of third chamber 260 and second chamber 240. Preferably, second channel 270 has a channel diameter and a depth that allow for free movement of the droplet. For example, second channel 270 may be a space having a depth of 20 µm to 500 µm from surface 212, and a diameter of 20 µm to 500 µm in the direction parallel to cover part 280.

In second channel 270, valve 275 is formed. Valve 275 is configured to open and close second channel 270 to control the movement of the droplet between second chamber 240 and third chamber 260. In the present embodiment, valve 275 is a membrane valve. As illustrated in FIG. 6, valve 275 as a membrane valve includes diaphragm 275a and partition wall 275b. In a valve open state, a gap for moving fluid is formed between diaphragm 275a and partition wall 275b. In a valve closing state, diaphragm 275a is pressed and brought into contact with partition wall 275b by a pusher or the like. As such, no gap is formed between diaphragm 275a and partition wall 275b.

In the present embodiment, in plan view of fluid handling device 200 (body part 210), third chambers 260 are arranged and disposed on both sides of first channel 220 (separation region 226). Third chambers 260 on both sides are alternately communicated with respective second chambers 240 (reception parts 242) arranged and disposed along first channel 220 (separation region 226) through respective second channels 270. As such, second channels 270 and valves 275 are also arranged and disposed on both side of first channel 220 (separation region 226). Valves 275 are arranged and disposed as described above in the present embodiment, and thus valves 275 can be easily operated at the same time, and can be continuously operated.

The configuration of storage chamber 250 may be the same as that of the first embodiment, and therefore the detailed description thereof is omitted.

Operation of Fluid Handling Device

Fluid handling device 200 is used in the state where cover part 280 is joined to surface 212 (except for third chamber 260) of body part 210.

Figure 7A:
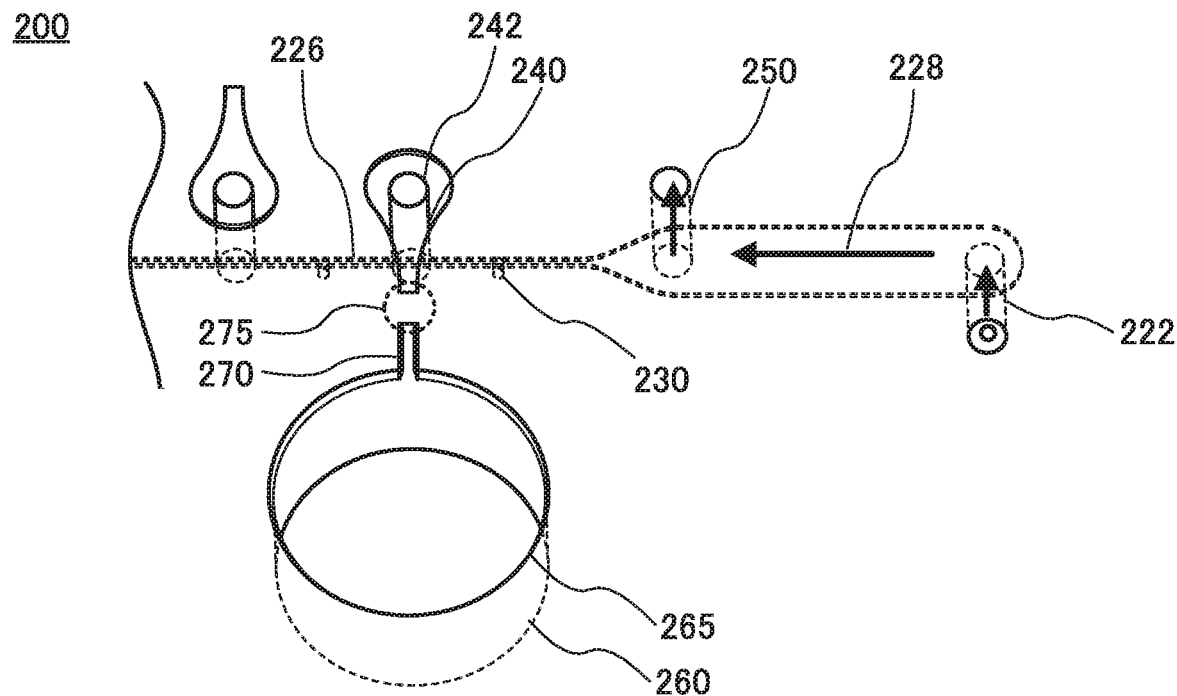
FIG. 7A is an enlarged schematic view of a region around the introduction region and illustrates a movement of droplets when fluid containing a plurality of droplets is introduced to the first channel.
Figure 7B:
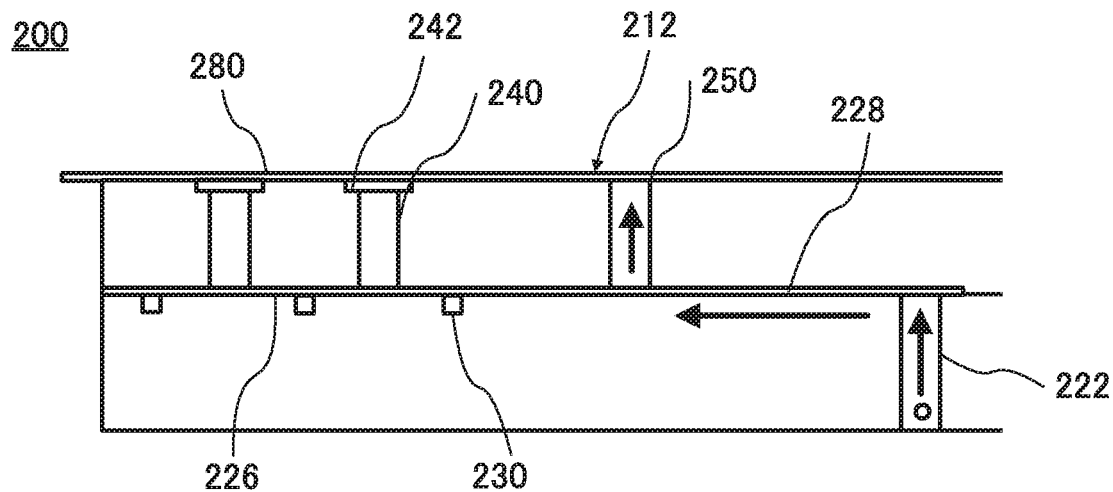
FIG. 7B is an enlarged sectional view of in a region around the introduction region taken along line 5C-5C illustrated in FIG. 5B and illustrates a movement of droplets when fluid containing a plurality of droplets is introduced to the first channel.

First, fluid handling device 200 is set at an angle at which storage chamber 250 is on the upper side than first channel 220 (introduction region 228) in the vertical direction (the second state), and fluid containing a plurality of droplets is introduced from inlet 222 to first channel 220. FIGS. 7A and 7B are schematic views illustrating movement of droplets at this time (with arrows in the drawing). FIG. 7A is an enlarged schematic view of a region around introduction region 228, and FIG. 7B is an enlarged sectional view of a region around introduction region 228 taken along line 5C-5C illustrated in FIG. 5B. With this configuration, as in the first embodiment, the droplet is retained in introduction region 228, and moves to storage chamber 250. Note that the opening of storage chamber 250, reception part 242 of second chamber 240, valve 275 and a part of second channel 270 are covered with cover part 280 although they are indicated with the solid line in FIG. 7A. In addition, in FIG. 7B, the upper side in the drawing is the upper side in the vertical direction.

As in the first embodiment, the flow velocity of the introduced droplet at the time of introducing droplet from inlet 222 to first channel 220 (introduction region 228) may be set to any value as long as the movement to separation region 226 due to deformation of the droplet is not easily caused. For example, the flow velocity of the droplet introduced at this time may be 20 μm/s to 2000 μm/s.

Figure 8A:
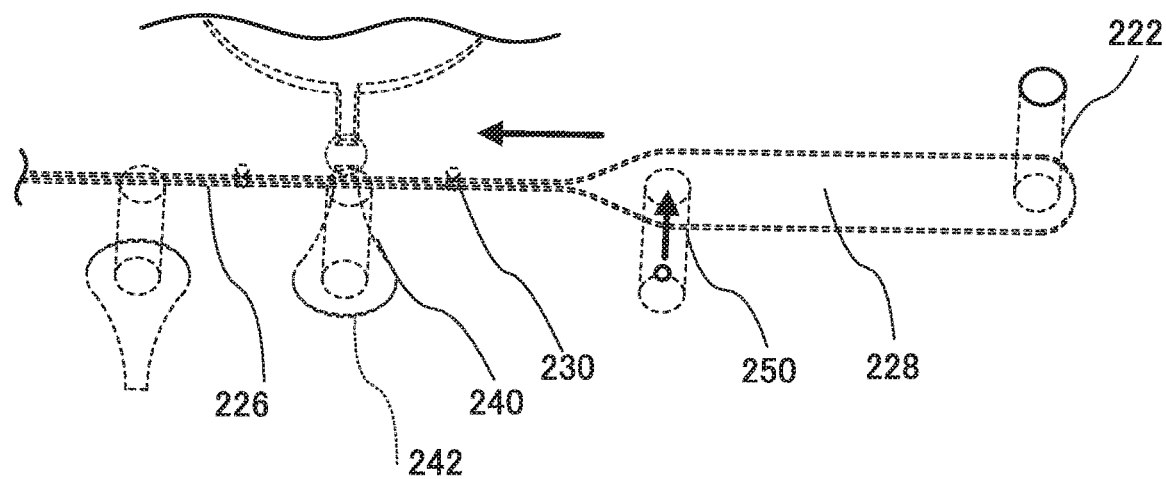
FIG. 8A is an enlarged schematic view of a region around the introduction region and illustrates a movement of droplets when droplets are moved to the first chamber.
Figure 8B:
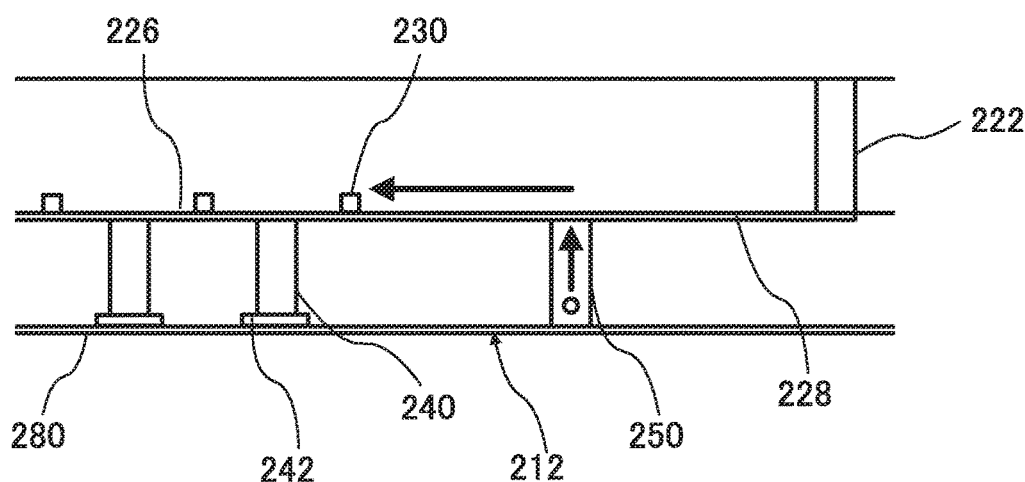
FIG. 8B is an enlarged sectional view of in a region around the introduction region taken along line 5C-5C illustrated in FIG. 5B and illustrates a movement of droplets when droplets are moved to the first chamber.

Next, fluid handling device 200 is turned about an axis parallel to first channel 220 as a turning axis to set fluid handling device 200 at an angle at which first chamber 230 is on the upper side than first channel 220 (separation region 226) in the vertical direction (the first state). In this state, fluid that does not contain the droplet is introduced into first channel 220 from inlet 222. FIGS. 8A and 8B are schematic views illustrating a movement of droplets at this time (with arrows in the drawing). FIG. 8A is an enlarged schematic view of a region around introduction region 228, and FIG. 8B is an enlarged sectional view of a region around introduction region 228 taken along line 5C-5C illustrated in FIG. 5B. Note that, in FIG. 8B, the upper side in the drawing is the upper side in the vertical direction. With this configuration, as in the first embodiment, the droplets move through separation region 226 of first channel 220 in the direction of outlet 224, and are sequentially captured in first chambers 230 from the inlet 222 side to the outlet 224 side. Note that, at this time, to reduce loss of the fluid from third chamber 260, valve 275 is set to a closed state.

As in the first embodiment, the flow velocity of the droplet at the time of introducing the droplet from introduction region 228 (storage chamber 250) to separation region 226 may be set to any value as long as the droplet can be moved from introduction region 228 to separation region 226 having a smaller width by slightly deforming the droplet. For example, the flow velocity of the droplet introduced at this time may be 20 μm/s to 2000 μm/s.

Figure 9A:
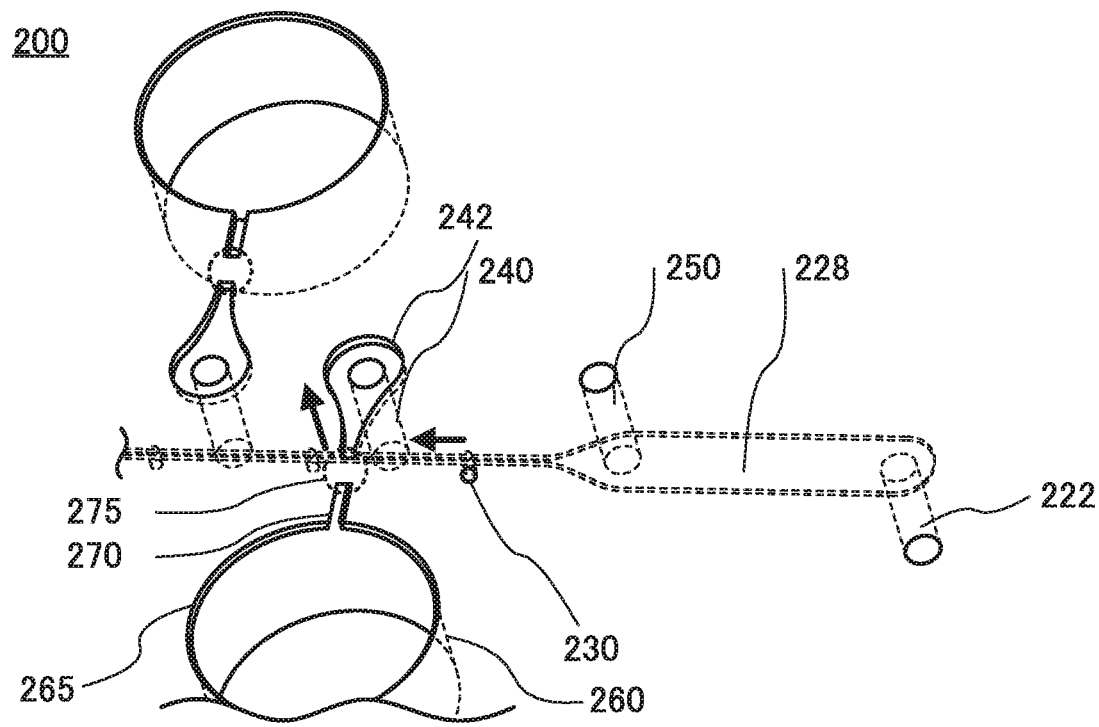
FIG. 9A is an enlarged schematic view of a region around the introduction region and illustrates a movement of droplets when droplets are moved to the second chamber.
Figure 9B:
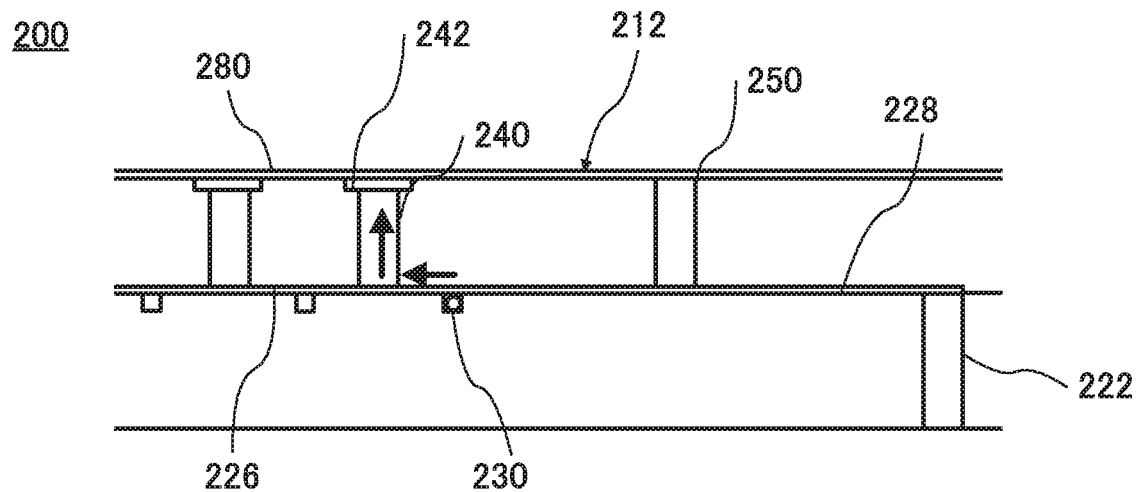
FIG. 9B is an enlarged sectional view of in a region around the introduction region taken along line 5C-5C illustrated in FIG. 5B and illustrates a movement of droplets when droplets are moved to the second chamber.

Next, fluid handling device 200 is again turned about an axis parallel to first channel 220 as a turning axis to set fluid handling device 200 at an angle at which second chamber 240 is on the upper side than first channel 220 (separation region 226) in the vertical direction (the second state). In this state, fluid that does not contain the droplet is introduced into first channel 220 from inlet 222. Note that, at this time, valve 275 is closed. FIGS. 9A and 9B are schematic views illustrating a movement of droplets at this time (with arrows in the drawing). FIG. 9A is an enlarged schematic view of a region around introduction region 228, and FIG. 9B is an enlarged sectional view of a region around introduction region 228 taken along line 5C-5C illustrated in FIG. 5B. Note that the opening of storage chamber 250, reception part 242 of second chamber 240, valve 275 and a part of second channel 270 are covered with cover part 280 although they are indicated with the solid line in FIG. 9A. In addition, in FIG. 9B, the upper side in the drawing is the upper side in the vertical direction. With this configuration, as in the first embodiment, the droplets captured in first chamber 230 move to corresponding second chambers 240 from respective first chambers 230 without being again mixed.

As in the first embodiment, the flow velocity of the introduced droplet at the time of moving the droplet from first chamber 230 to second chamber 240 may be set to any value as long as the droplet can be moved in separation region 226 by slightly deforming the droplet. For example, the flow velocity of the droplet introduced at this time may be 60 μm/s to 2000 μm/s.

Figure 10:
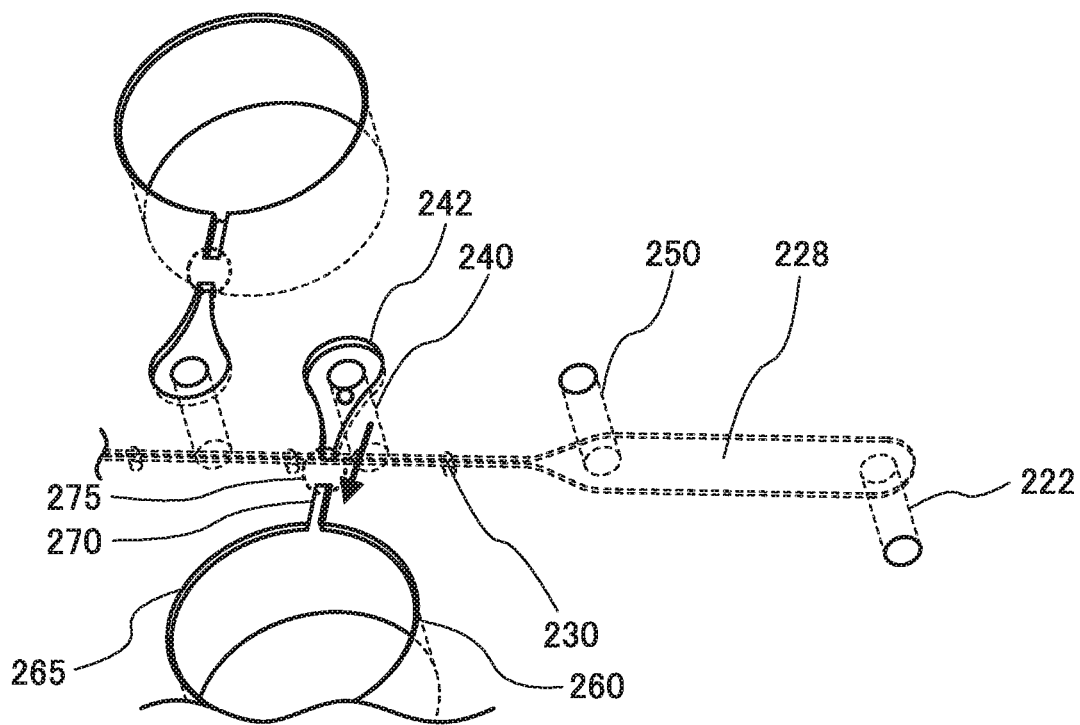
FIG. 10 is an enlarged schematic view of a region around the introduction region and illustrates a movement of droplets when droplets are moved to a third chamber.

Next, without turning fluid handling device 200 (the second state), valve 275 is released. In this state, fluid that does not contain the droplet is introduced into first channel 220 from inlet 222. FIG. 10 is an enlarged schematic view of a region around introduction region 228 and illustrates a movement of droplets at this time (with arrows in the drawing). Note that the opening of storage chamber 250, reception part 242 of second chamber 240, valve 275 and a part of second channel 270 are covered with cover part 280 although they are indicated with the solid line in FIG. 10.

The introduced fluid component presses the droplet moved to second chamber 240 to move it to third chamber 260 through second channel 270. In this manner, the droplets captured in respective first chambers 230 move to the corresponding third chambers 260 through corresponding to second chambers 240. Thus, the droplets individually captured in first chambers 230 can individually move to third chambers 260 without being again mixed.

When moving the droplet from second chamber 240 to third chamber 260, it is not necessary to deform the droplet. For example, the flow velocity of the droplet introduced at this time may be 60 μm/s to 2000 μm/s.

Finally, without changing the angle of fluid handling device 200 (the second state), cover part 280 is punctured, and the droplet moved to each third chamber 260 is removed with a pipette or the like. Each third chamber 260 houses only one or a small number of droplets, and thus the droplets can be easily individually collected.

Fluid handling device 200 after the droplet is collected (separated) can be reused by washing first channel 220 and second channel 270 with washing solution supplied thereto and thereafter joining new cover part 280.

Effect

With fluid handling device 200 according to the present embodiment, droplets can be easily separated.

Other Embodiments

While the storage chamber is a substantially columnar space in embodiment 1 and embodiment 2, the shape of the storage chamber is not limited. For example, in the storage chamber, the end portion adjacent to the introduction region may be chamfered.

Figure 11A:
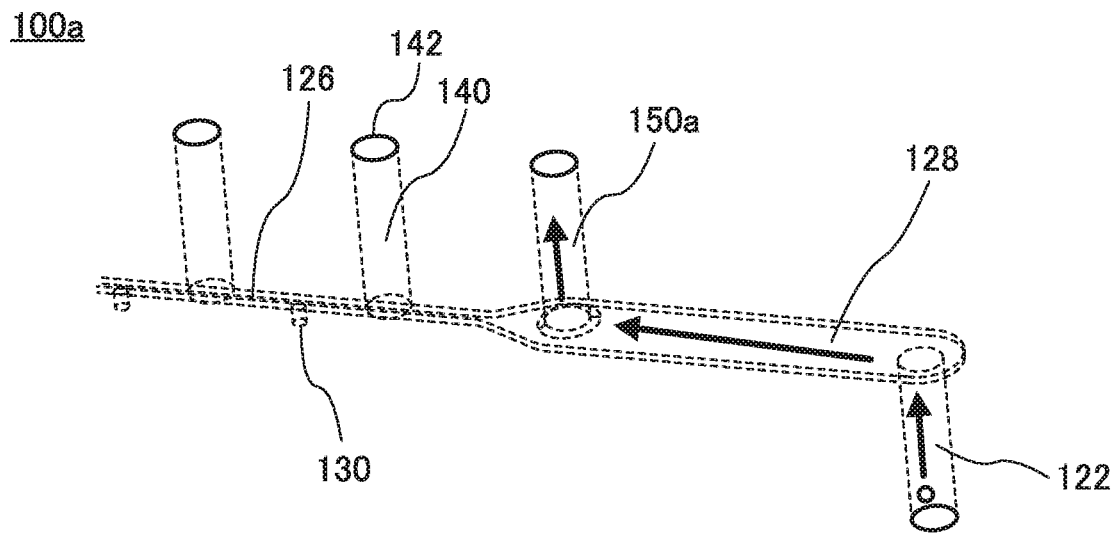
FIGS. 11A and 11B are schematic views illustrating a state where fluid containing a plurality of droplets is introduced to the first channel from an inlet during operation of a fluid handling device including a storage chamber with a chamfer end portion.
Figure 11B:
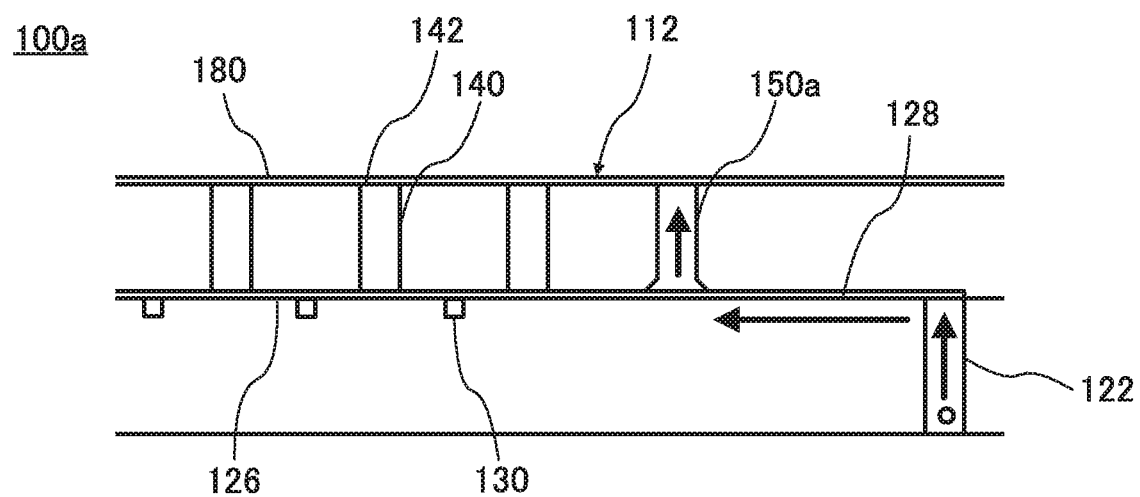

FIGS. 11A and 11B are schematic views illustrating a state where fluid containing a plurality of droplets is introduced from inlet 122 to first channel 120 during operation of fluid handling device 100a provided with storage chamber 150a whose end portion is chamfered. FIGS. 11A and 11B correspond to FIGS. 2A and 2B, respectively.

As illustrated in FIGS. 11A and 11B, when the end portion of storage chamber 150a adjacent to introduction region 128 is chamfered, the droplet introduced into introduction region 128 is less caught at the end portion where introduction region 128 and storage chamber 150a are joined, and the droplet is easily moved from introduction region 128 to storage chamber 150a. Thus, storage chamber 150a having the chamfered end portion can reduce separation failure due to the droplet that fails to move from introduction region 128 to storage chamber 150a and mistakenly moves to separation region 126.

Note that the chamfering may be provided to the entire end portion of storage chamber 150a adjacent to introduction region, or may be provided to only a part (a region on the inlet 122 side where the droplet is easily caught) of the end portion.

While FIGS. 11A and 11B illustrates a configuration of fluid handling device 100 according to the first embodiment in which the end portion of storage chamber 150a adjacent to introduction region 128 is chamfered, the end portion of storage chamber 250 adjacent to introduction region 228 of fluid handling device 200 of second embodiment may be chamfered.

Application

Fluid handling devices 100 and 200 may be used as a micro channel device.

Fluid Handling System

The fluid handling device of each embodiment may be used in conjunction with a turning mechanism configured to turn the fluid handling device. Specifically, the fluid handling system includes the fluid handling device, a holding mechanism configured to hold the fluid handling device, and a turning mechanism configured to switch between the first state and the second state by turning the fluid handling device.

Note that the fluid handling device and the fluid handling system according to the embodiments of the present invention are not limited to above-mentioned configurations. For example, the inner surface of the first channel or the second channel may be hydrophilized as necessary.

In the embodiments, when moving the droplet from the first chamber to the second chamber, the fluid is caused to flow from the inlet to the outlet to move the droplet from the first chamber to the second chamber on the outlet side. However, the fluid may be caused to flow from the outlet to the inlet to move the droplet from the first chamber to the second chamber on the inlet side.

While the fluid handling device is switched between the first state and the second state by turning it about an axis parallel to the first channel as a turning axis in the embodiments, the fluid handling device may be turned about any turning axis depending on the widening direction of the first chamber and the second chamber and the like. For example, the fluid handling device may be switched between the first state and the second state by turning it about a turning axis that is orthogonal to the widening direction of the second chamber with respect to first channel. At this time, the turning mechanism of the fluid handling system may turn the fluid handling device about any axis such as an axis that is orthogonal to the widening direction of the second chamber with respect to the first channel, for example.

While the cross-sectional area of the separation region in the cross-section perpendicular to the flow direction of the fluid is smaller than the cross-sectional area of the droplet in the embodiments, the cross-sectional area of the separation region may be the same as or greater than the cross-sectional area of the droplet.

This application is entitled to and claims the benefit of Japanese Patent Application No. 2018-023988 filed on Feb. 14, 2018, the disclosure each of which including the specification, drawings and abstract is incorporated herein by reference in its entirety.

INDUSTRIAL APPLICABILITY

The fluid handling device of the embodiment of the present invention is useful for a fluid handling device used in medical fields and the like, for example.

REFERENCE SIGNS LIST 100, 100a, 200 Fluid handling device
110, 210 Body part
112, 212 Surface
114, 214 Upper substrate
116, 216 Lower substrate
120, 220 First channel
122, 222 Inlet
124, 224 Outlet
126, 226 Separation region
128, 228 Introduction region
130, 230 First chamber
140, 240 Second chamber
142 Opening
150, 150a, 250 Storage chamber
242 Reception part
260 Third chamber
265 Opening
270 Second channel
275 Valve
275a Diaphragm
275b Partition wall
180, 280 Cover part

What is claimed is:

1. A fluid handling device comprising:
an inlet;
an outlet;
a first channel through which a droplet is movable when fluid containing the droplet is caused to flow through the first channel, the first channel being connected to the inlet and the outlet;

a first chamber formed by widening the first channel, the first chamber being configured to capture the droplet moving through the first channel; and a second chamber to which the droplet captured by the first chamber is movable through the first channel, the second chamber being formed by widening the first channel, wherein the fluid handling device is switchable between a first state and a second state by turning the fluid handling device, the first state being a state in which the first chamber is widened to an upper side than the first channel in a vertical direction, and when fluid is caused to flow through the first channel, the droplet moving through the first channel is captured by the first chamber, the second state being a state in which the second chamber is widened to the upper side than the first channel in the vertical direction, and when fluid is caused to flow through the first channel, the droplet captured by the first chamber moves to the second chamber through the first channel.

2. The fluid handling device according to claim 1, wherein the first chamber and the second chamber are formed by widening the first channel in directions different from each other.

3. The fluid handling device according to claim 1, wherein the first chamber and the second chamber are alternately disposed in a flow direction.

4. The fluid handling device according to claim 1, wherein the first chamber is a space having a size for capturing one droplet.

5. The fluid handling device according to claim 1,
wherein the first channel includes a separation region and an introduction region, the separation region being a region in which the droplet is captured in the first chamber, the introduction region being a region provided closer to an inlet side than the separation region;
wherein the separation region is a channel whose cross-sectional area in a cross-section perpendicular to a flow direction of the fluid is smaller than a cross-sectional area of the droplet; and
wherein the introduction region is a channel whose cross-sectional area in a cross-section perpendicular to the flow direction of the fluid is greater than the cross-sectional area of the droplet.

6. The fluid handling device according to claim 5,
wherein the introduction region includes a storage chamber formed by widening the first channel; and
wherein the storage chamber is formed by widening the first chamber in a direction different from the first channel.

7. The fluid handling device according to claim 6, wherein in the storage chamber, an end portion adjacent to the introduction region is chamfered.

8. The fluid handling device according to claim 1,
wherein the second chamber includes an opening that is open to outside; and
wherein the opening is covered with a cover part configured to be punctured.

9. The fluid handling device according to claim 1, further comprising:
a third chamber to which the droplet moved to the second chamber is movable; and
a valve configured to control movement of the droplet between the second chamber and the third chamber,
wherein the third chamber includes an opening that is open to outside.

10. A fluid handling system comprising:
the fluid handling device according to claim 1;
a holding mechanism configured to hold the fluid handling device; and
a turning mechanism configured to turn the fluid handling device to switch the fluid handling device between the first state and the second state.

11. The fluid handling system according to claim 10, wherein the turning mechanism is switchable between the first state and the second state by turning about a turning axis, the turning axis being an axis parallel to the first channel, or an axis orthogonal to widening directions of the first channel and the second chamber.

* * * * *